Figure 1:
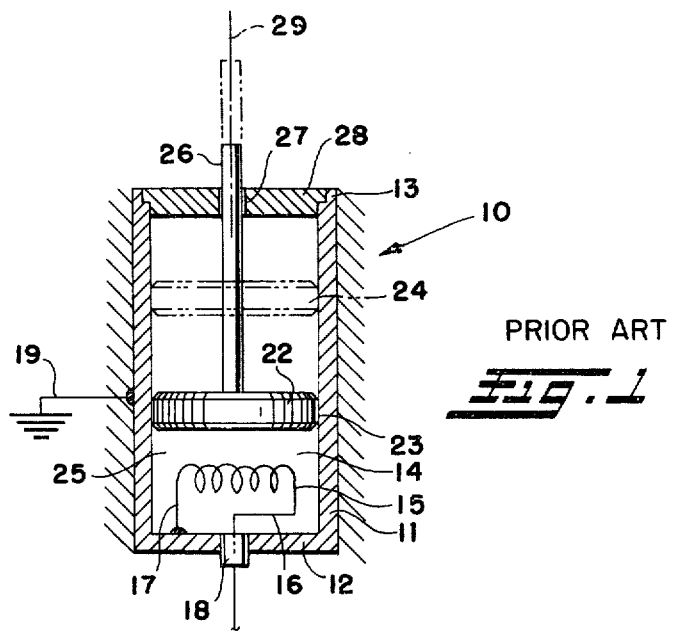

United States Patent [19]
Smith et al.

[11] 3,886,513
[45] May 27, 1975

[54] DE-ENERGIZING SYSTEM FOR THERMAL ACTUATOR

[75] Inventors: Lynn C. Smith, Willoughby Hills; Richard G. Huebscher, Mayfield Village, both of Ohio

[73] Assignee: Gould Inc., Willoughby, Ohio

[22] Filed: Nov. 27, 1973

[21] Appl. No.: 419,269

[52] U.S. Cl. .................. 337/315; 60/516; 60/530
[51] Int. Cl. ............................................ H01h 37/44
[58] Field of Search ............. 337/315, 324, 309, 51; 60/516, 528, 530, 531, 527

[56] References Cited
UNITED STATES PATENTS

| | | |
|---|---|---|
| 2,512,212 | 6/1950 | Molotzak .............................. 60/530 |
| 3,194,010 | 7/1965 | Lejon ................................... 60/531 |
| 3,256,686 | 6/1966 | Lindberg, Jr. ....................... 60/516 |
| 3,431,726 | 3/1969 | Iversen ................................ 60/530 |
| 3,500,634 | 3/1970 | Waseleski, Jr. et al. ............. 60/528 |

*Primary Examiner*—Harold Broome
*Attorney, Agent, or Firm*—Donnelly, Maky, Renner & Otto

[57] ABSTRACT

A thermal actuator which exerts an output force in response to an energy input is movably positioned within the support casing of a de-energizing system therefor. A pre-loaded spring normally urges the thermal actuator away from a pair of normally closed contacts through which an energization current may flow; and when an externally applied force to the energized thermal actuator exceeds the force of the spring, or when the movable piston in the thermal actuator nearly achieves full stroke the actuator is moved within the support casing to open the contacts effecting actuator de-energization.

13 Claims, 2 Drawing Figures

PATENTED MAY 27 1975  3,886,513

PRIOR ART

DE-ENERGIZING SYSTEM FOR THERMAL ACTUATOR

This invention relates to a system for de-energizing a thermal actuator, and particularly to such a device which is responsive to mechanical overload conditions, a thermal actuator being a device responsive to a thermal input to product an output force.

Thermal actuators generally comprise a casing with a movable piston forming a variable volume chamber therein with an actuator arm or the like being connected to the piston and adapted for coupling to do work when the thermal actuator is energized. The piston and actuator arm are normally movable between a de-energized position and a full stroke position. A thermally expansible and contractible material is sealed in the chamber, and when the material is heated to expansion, an increase in pressure on one side of the movable piston relative to the pressure on the other side thereof causes it to move in the casing toward the full stroke position so as to expand the chamber.

Prior art thermal actuators have been subject to premature heating element burn-out, require excessive energy consumption when overloaded, and have not been suitably responsive to overload conditions. Also, prior art thermal actuators have required complicated support structures for mounting the same in order to provide a work connection between the activator arm and another element to be moved. The instant invention encompasses a thermal actuator operable preferably in all attitudes and which is responsive to overload and nearly full stroke conditions, whereby an on-off recycling of the thermal actuator is effected upon a determination of either of such conditions.

In one form of the invention, a thermal actuator is movably positioned within a support casing having up and down stop members for limiting movement of the thermal actuator therein. A spring located between the thermal actuator and the casing proximate the down stop end produces a biasing force against the former urging it away from the down stop member, and an activator arm of the thermal actuator extends in line with the direction of the force exerted by the spring. A transverse arm slidable in guides formed in the casing is attached to the activator arm, the former adapted to abut a stop just prior to full stroke of the piston and activator arm. A pair of electric contacts provide a power connection for the thermal actuator, such contacts being responsive to the position of the thermal actuator within the support casing. The electro-thermal actuator configuration provides for deenergization thereof upon application of an overload force from either an external load or the transverse arm abutting its stop to the activator arm of the piston, such force being opposed to and overcoming that of the spring to effect opening of the electric contacts.

It is, accordingly, a primary object of the invention to provide a thermal actuator improved in the noted respects.

A further object of the invention is to provide a thermal actuator that avoids burn-out of the heating element when excessive mechanical loads are applied.

Another object of the invention is to provide a thermal actuator that has a limited stroke force.

An additional object of the invention is to provide a thermal actuator that conserves power when a mechanical overload condition exists.

Still a further object of the invention is to provide a thermal actuator which is automatically de-energized when mechanically overloaded.

Still another object of the invention is to provide a functional support structure for a thermal actuator.

Still an additional object of the invention is to provide for recycling of a thermal actuator when a mechanical overload condition is determined with such recycling continuing until termination of such overload condition.

Yet a further object of the invention is to provide for recycling of a thermal actuator when a mechanical overload condition is determined with such recycling continuing until termination of the overload condition and each successive cycle requiring a longer time than the preceding cycles until the overload condition terminates.

Yet another object of the invention is to de-energize a thermal actuator just prior to full stroke to prevent excessive pressure build up, rupture of internal parts, burnout, and the like in such a device.

Other objects and advantages of the present invention will become apparent as the following description proceeds.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principles of the invention may be employed.

Figure 2:
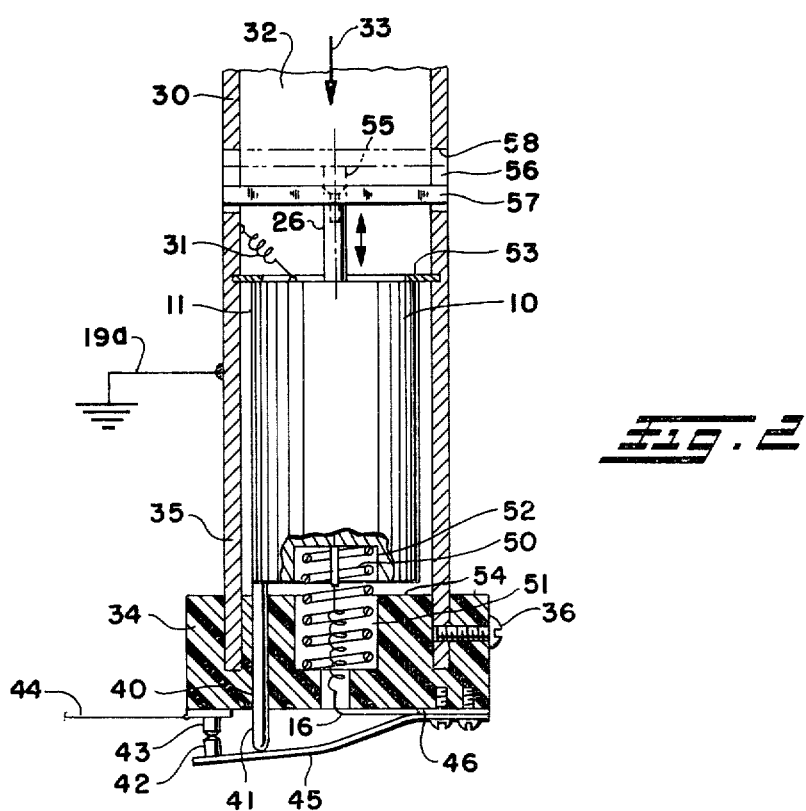

In the annexed drawing:

FIG. 1 is a simplified cross-sectional view of a basic type of thermal actuator; and FIG. 2 is a cross-sectional view of a de-energizing system for a thermal actuator in accordance with the present invention.

Referring now to the drawing wherein like reference numerals refer to like elements in the several figures, a basic linear thermal actuator generally indicated at 10 is shown in FIG. 1. This actuator includes a main body formed by a cylindrical casing 11 having a base 12 and an open end 13. An electric heater 14 including a round filament 15 is supported in the casing and is connected for energization from a source of energy by wires 16 and 17, the former exiting the casing through an insulating portion 18 and the latter being connected to the casing which is itself grounded at 19.

A movable piston 22 is positioned to slide in the casing 11, for example, between a first inner location 23 as shown and a second extended or more fully stroked location 24. The movable piston 22 should be in fluid sealed relation with casing 11 to form a variable volume chamber 25 in the actuator, and an activator rod 26 is fixed axially to the piston 22 and passes through an opening 27 in a cap 28 which closes the open end 13 of the casing 11. The activator rod 26 may be connected to transmit force to an external device, not shown, for doing work.

The variable volume chamber 25 contains a thermally expansible and contractible material to be heated by the heater 14 when energized. As heat is thus applied to such material, the pressure within the variable volume chamber 25 relative to ambient pressure, increases urging movable piston 22 to slide along a generally longitudinal axis 29 in the casing from the first location 23 toward the second extended location 24.

The thermally expansible and contractible material within the variable volume chamber 25 may be a liquid or gas which increases as it is heated; and azeotropic liquid which comprises a mixture of at least two liquids having different boiling points; a liquid which changes to gas phase as its temperature is increased, the gas requiring more volume than the liquid; or a metal hydride which may ingas and outgas upon change of temperature to vary the pressure within the variable volume chamber 25. Other types of thermally expansible and contractible materials, such as, for example, oils, waxes, or alcohol, also may be used. While a simplified thermal actuator is illustrated in FIG. 1, other thermal actuators may be used in connection with the de-energizing system to be described in detail below, such as those thermal actuators disclosed in U.S. Pat. No. 3,664,698, patented on May 23, 1972, and my co-pending patent application for "Thermal Actuator" Ser. No. 293,790, filed Oct. 2, 1972.

Although the thermal actuator is described as being responsive to the input of positive thermal energy or heat to cause a pressure increase in the variable volume chamber 25 urging the piston 22 to move toward the extended location 24 enlarging such chamber, the thermal actuator also may be designed to be responsive to the input of negative input energy or cooling. For example, if the variable volume chamber 25 were filled with a liquid, such as water, the application of cooling to the water can cause a solid phase change requiring increased volume and therefore urging movable piston 22 from the first withdrawn location to the second extended location. Of course, a similar response would occur by application of cooling to a vapor to change the same to a liquid or solid requiring less volume and producing a suction force on the piston. Similarly, while the thermal actuator shown in FIG. 1 includes an electric heater, other types of heating devices may be used, such as, for example, a radiation source.

Turning now more particularly to FIG. 2, the thermal actuator 10 is movable positioned within a support casing 30 formed, for example, of electrically conductive material, and the casing of the actuator is coupled by a grounding strap 31 to the support casing, which itself is grounded at 19a. The support casing is open at the end 32 to permit coupling of the piston activator arm 26 of the actuator 10 to be coupled to an external load for doing work on the same, and the external load force, which may be applied in opposition to that of the piston activator arm, is represented by the arrow 33.

A non-conductive cap portion 34, for example, formed of phenolic material, is positioned at the end 35 of the support casing 30, and a screw fastener 36 provides a connection for the same. If desired, the screw fastener may provide the grounding connection for the support casing 30.

The cap portion 34 has an opening 40 defined therein through which a non-conductive pin 41 attached to the casing of the actuator 10 extends for disengaging a spring mounted movable contact 42 from a fixed contact 43. The fixed contact 43 is mounted on the cap portion 34 and is connected by a wire 44 to a source of electric energy; and the movable contact 42 and spring 45 are electrically connected to the wire 16 at a connection 46.

A compression spring 50 is located in aligned openings 51, 52, respectively formed in the cap portion 34 and the actuator 10 to provide normally a biasing force urging the movable actuator against the up end stop 53, which is fixed relative to the walls defining the boundary of the support casing 30. The surface 54 of the cap portion 34 provides a down end stop for the actuator 10. The thermal actuator 10 is, therefore, movable within the support casing 30 between the up end stop 53 and the surface 54, which provides the down end stop.

The compression spring 50 normally maintains the casing 11 of the actuator 10 in the position shown abutting the up stop 53, and when electric energy is applied on the wire 44 through the contacts 42, 43, spring 45, and wire 16, the actuator is energized, and the piston activator arm 26 is urged out from the actuator, for example, in the vertical direction shown toward the extended location 55 shown in phantom. When the electric energy applied to the wire 44 is cut off, then the piston activator arm 26 is retracted into the activator 10 to the withdrawn position shown.

A guide 56 is formed in the support casing 30 and may include two or more diametrically opposed longitudinally extending cut-outs of adequate width to receive the ends of a transverse arm 57 attached to the piston activator arm 26. The upper portions 58 as shown of the guide 56 serves as a stop for the transverse arm 57 so as to preclude movement of the piston 22 and activator arm 26 beyond full stroke position, and preferably such stop is so located to stop piston movement just prior to full stroke.

The contact 42, 43 are normally closed since the pre-load force of the compression spring 50 is designed to be at least slightly greater than the externally applied load force 33 to the piston activator arm 26. If the externally applied load 33 exceeds the pre-load force of the compression spring 50, the casing 11 of the actuator 10 will move toward the down stop surface 54, for example, in a downward direction generally along the axis 29 as shown to push the pin 41 against the cantilever spring 45, which opens the contacts 42, 43 to de-energize the actuator. Moreover, if the thermal actuator 10 is energized while unloaded or if the output force thereof exceeds that of the applied load 33, upon energization and stroking thereof the transverse arm 57 will move within the guide 56 and when in engagement with the stop 58 will effect, as illustrated, downward movement of the actuator casing 11 to open the contacts 42, 43 as described above. Thus, the cooperation of the transverse arm 57 and the stop 58 under motive force of the piston 22 effects an artificial overload condition to de-energize the thermal actuator. The output force as well as the maximum stroke distance of the thermal actuator 10 are, therefore, self-limiting, whereby when either the externally applied load or the transverse arm 57 and stop 58 applied artificial load exceeds the pre-load force of spring 50, then the thermal actuator automatically de-energizes, thus avoiding excessive pressure build up, rupture of internal parts, burn-out or the like.

After de-energization, the piston activator arm 26 will be withdrawn into the actuator, for example, by an internal spring, not shown, thereby reducing the piston force against the externally applied load force or against the stop 58 and permitting the actuator again to move upward toward an abutting position with respect to the up stop 53 under the influence of the compression spring 50. Thus, the pin 41 is also withdrawn upward and the contacts 42, 43 will close to re-energize the heater within the actuator 10 to complete one operational cycle thereof.

The re-energization of the heater within the actuator 10 causes the piston activator arm 26 to be forced out from the actuator casing. If the overload condition still exists, then the extension of the piston activator arm 26 increases the reaction force against the activator arm of the actuator causing the same to overcome the force of the spring 50, and the pin 41 again opens the contacts 42, 43. The deenergization and re-energization cycling will continue as long as the activator 10 is overloaded by an externally applied load having a force greater than that of the compression spring 50. Re-closing time or the time for re-energization of the actuator 10 increases as repeated cycles of the above-described operation occur due, for example, to the increased temperature of the actuator and other elements associated therewith.

The support casing 30 or the cap portion 34 may be easily mounted to provide a coupling for the piston activator arm 26 to do work on an external load without hindering free movement of the activator arm or the thermal actuator itself. Although the actuator and de-energization system therefor are shown positioned for vertical movement whereby the compression spring 50 provides support for the actuator 10 within the support casing 30, the apparatus may be similarly disposed in a horizontal direction. In the latter case the actuator 10 may be at least partially supported on rollers or a guide surface within the support casing or the compression spring 50 may be rigidly connected to the actuator casing being sufficiently strong to remain substantially uninfluenced by the torque exerted thereon by the actuator.

Thus, it may now be seen that the invention provides for de-energization of a thermal actuator when presented with an overload condition to avoid premature heater burn-out as well as to conserve energy, and the stroke limiting arrangement also precludes such burn-out as well as damage to internal parts. Also, the de-energizing system is limited in the external force that it can apply by the piston activator arm, thus assuring that the load will not be damaged by application of an excessive force thereto.

The embodiments of the invention in which an exclusive property or privilege is claimed are defined as follows:

1. A de-energizing system for a thermal actuator that includes a casing in which a variable volume chamber is defined, a piston movably positioned in said casing, and a thermally expansible material in said chamber that increases pressure therein to move the piston when said thermal actuator is energized, said thermal actuator producing an output force in response to an energy input, comprising a support; means for movably supporting said thermal actuator relative to said support; means for selectively coupling said thermal actuator for energization from an energy source; and means responsive to an overload condition of said thermal actuator for de-energizing the same, said means for de-energizing being responsive to movement of said thermal actuator relative to said support upon occurrence of an overload condition and also being operatively coupled to said means for selectively coupling for controlling the same to de-energize said thermal actuator.

2. A de-energizing system for a thermal actuator that produces an output force in response to an energy input as set forth in claim 1, wherein said support comprises a suppport casing defining a boundary about at least a portion of said thermal actuator, and said means for movably supporting comprises means for resiliently supporting said thermal actuator within said support casing.

3. A de-energization system for a thermal actuator that produces an output force in response to an energy input as set forth in claim 2, further comprising end stop means for defining the bounds of permitted movement of said thermal actuator within said support casing.

4. A de-energizing system for a thermal actuator that produces an output force in response to an energy input as set forth in claim 1, wherein said means for selectively coupling comprises a pair of normally closed contacts, one of said contacts being fixed relative to said support, and resilient means coupled to said support for movably supporting the other one of said contacts.

5. A de-energizing system for a thermal actuator that produces an output force in response to an energy input as set forth in claim 4, wherein said means responsive to an overload condition comprises a rigid element coupled to said thermal actuator and aligned with said resilient means for opening said pair of contacts when an overload condition is determined.

6. A de-energizing system for a thermal actuator that produces an output force in response to an energy input, comprising a support; means for movably supporting said thermal actuator relative to said support; means for selectively coupling said thermal actuator for energization from an energy source; and means responsive to an overload condition of said thermal actuator for de-energizing the same, said means for de-energizing being responsive to movement of said thermal actuator relative to said support upon occurrence of an overload condition and also being operatively coupled to said means for selectively coupling for controlling the same to de-energize said thermal actuator; said means for selectively coupling comprising a pair of normally closed contacts, one of said contacts being fixed relative to said support, and resilient means coupled to said support for movably supporting the other one of said contacts; said means responsive to an overload condition comprising a rigid element coupled to said thermal actuator and aligned with said resilient means for opening said pair of contacts when an overload condition is determined; and said support comprising a support casing and said means for movably supporting comprising further resilient means for supporting said thermal actuator within said support casing, said further resilient means normally maintaining said thermal actuator at a location within said support casing remote from said resilient means, whereby an overload condition of said thermal actuator drives the same in opposition to the force exerted by said further resilient means to effect opening of said contacts by said rigid element.

7. A de-energizing system for a thermal actuator that produces an output force in response to an energy input as set forth in claim 6, wherein said support casing has at least one open end closed by an electrically non-conductive cap, a pair of aligned recesses formed, respectively, in said cap and said thermal actuator, and said further resilient means being positioned within said pair of aligned recesses normally biasing said thermal actuator in a direction away from said cap.

8. A de-energizing system for a thermal actuator that produces an output force in response to an energy input as set forth in claim 7, said one of said contacts being attached to said cap, said resilient means being attached to said cap, and said cap having an opening defined therein through which said rigid element extends.

9. A de-energizing system for a thermal actuator that produces an output force in response to an energy input as set forth in claim 8, further comprising an electrical lead coupling said contacts and resilient means to said thermal actuator for energization of the latter.

10. A de-energizing system for a thermal actuator that produces an output force in response to an energy input as set forth in claim 9, further comprising a ground connection for said thermal actuator and said support casing.

11. A de-energizing system for a thermal actuator that produces an output force in response to an energy input, comprising a support; means for movably supporting said thermal actuator relative to said support; means for selectively coupling said thermal actuator for energization from an energy source; and means responsive to an overload condition of said thermal actuator for de-energizing the same, said means for de-energizing being responsive to movement of said thermal actuator relative to said support upon occurrence of an overload condition and also being operatively coupled to said means for selectively coupling for controlling the same to de-energize said thermal actuator; said thermal actuator including an activator output arm movable from a withdrawn position to an extended position upon energization of said thermal actuator; and further comprising means for limiting travel of said activator output arm to establish an artificial overload condition prior to maximum extension thereof.

12. A de-energizing system for a thermal actuator that produces an output force in response to an energy input as set forth in claim 11, wherein said means for limiting comprises a stop fixedly located relative to said support, and a rigid member coupled to said activator output arm and positioned to engage said stop prior to such maximum extension thereby to effect movement of said thermal actuator in said support and subsequent de-energization thereof.

13. A de-energizing system for a thermal actuator that produces an output force in response to an energy input as set forth in claim 12, wherein said support includes a guide defined therein, said guide terminating in said stop, and said rigid member comprising a transverse arm slidable in said guide.

* * * * *